_United States Patent Office_

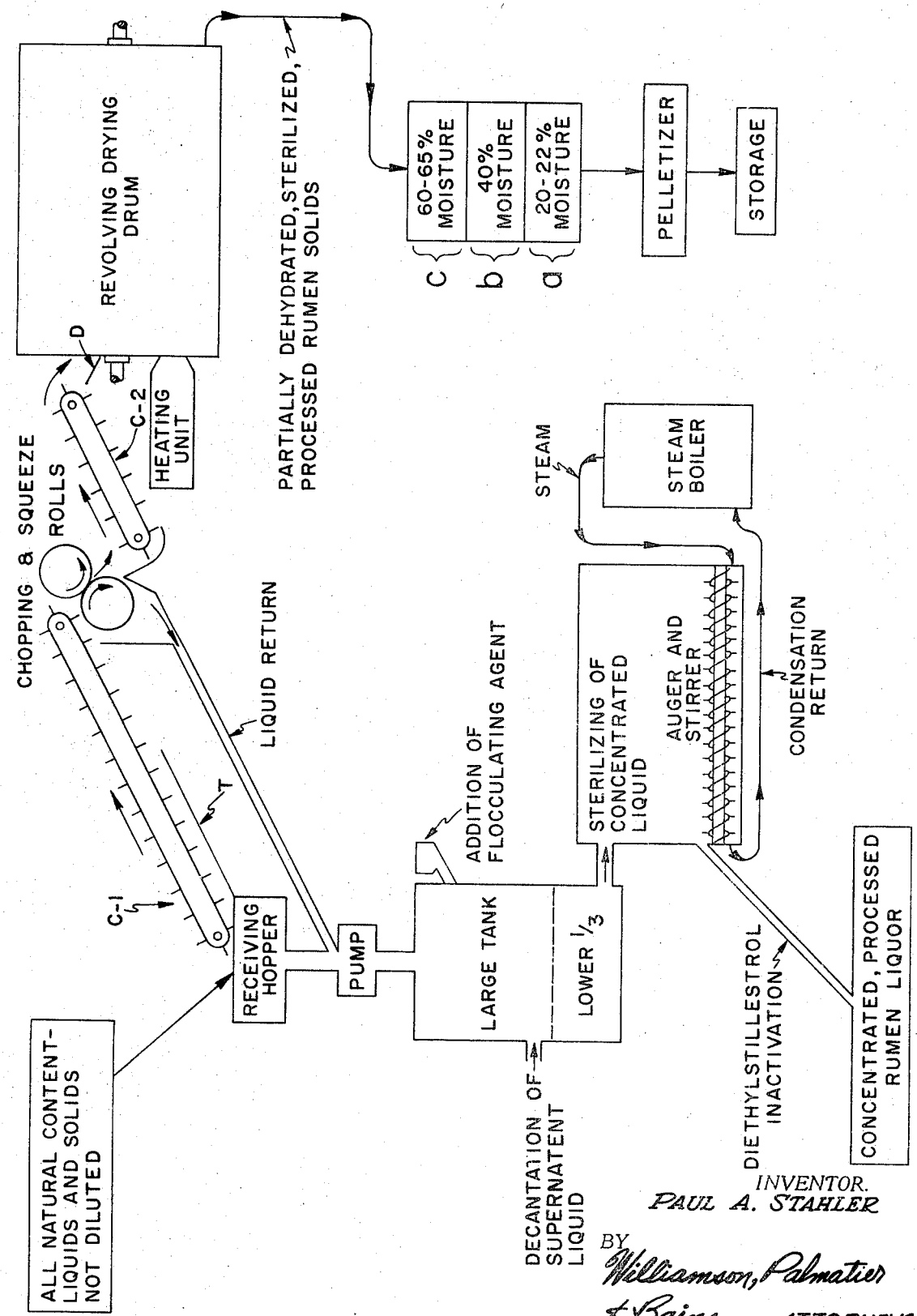

3,545,977
Patented Dec. 8, 1970

3,545,977
PRODUCTION OF VALUABLE ANIMAL FEED COMPONENTS THROUGH PROCESSING OF THE RUMEN CONTENT OF SLAUGHTERED CATTLE AND PRODUCTS
Paul A. Stahler, R.R., Jordan, Minn.
Filed Sept. 7, 1967, Ser. No. 667,324
Int. Cl. A23k 1/00
U.S. Cl. 99—7                          3 Claims

ABSTRACT OF THE DISCLOSURE

A method of treating the rumen content of slaughtered cattle to produce a nutritive animal feed composition. The liquid fraction of the rumen content is separated from the solid material, subjected to flocculation to concentrate solids, suspensions, and coagulants contained therein, and the concentrated portion is thereafter sterilized by heat and treated to inactivate diethyl-stilbesterol.

BACKGROUND OF THE INVENTION

Explanation of terms

The terms "paunch content" and "rumen content" herein both refer to the total material within the first stomach (and this is also known as the "paunch" or "the rumen" of cattle. This paunch or rumen content consists of partially digested feed materials, natural or prepared recently eaten by the animal before slaughter, together with digestive juices and millions of bacteria, most of which normally live in the rumen and perform an essential roll in the digestive process of cattle. The average amount of this material contained in the paunch of said slaughtered cattle weighs approximately 57 pounds and measures between 7 and 8 gallons.

Serious problems foreshadowing the invention (a) In the packing industry.—Since the packing industry's conception, approximately 75 years ago, the paunch content of slaughtered animals has routinely been flushed down the sewer. Because of the consistency of such material, additional large amounts of water were required in the flushing process and, therefore, added to the volume of the total sewage.

The economic status of the packing industry at present requires a careful reevaluation of production costs in order to maintain a justified margin of profit. Water costs as well as sewage costs constitute an important percentage in these production expenses. The cost for sewage services is based on the volume of sewage as well as the Biological Oxygen Demand of the sewage material. The Biological Oxygen Demand, hereinafter referred to as "B.O.D." signifies the amount of oxygen that a specific amount of sewage will use in a 5 day period and is measured in parts per million (p.p.m.). By way of simple explanation using a hypothetical example, let us suppose that we have one million pounds of sewage which in a 5 day period consumed 100 pounds of oxygen in the normal process of degeneration. The B.O.D. of the sewage would then be 100. The B.O.D. of paunch material is *extremely high* by comparison with normal sewage. This further complicates the problems with which packing plants are today confronted.

(b) In sewage disposal plants.—The sewage disposal plants in our larger cities where packing industries are located, are generally overburdened. Current national and state programs of water pollution control have clearly demonstrated the need for the development of more efficient sewage treatment methods and, wherever possible, the diminuation of industrial waste entering the sewage systems.

By its very nature the paunch material entering sewage systems poses special problems since the solid portions of such material are extremely difficult to decompose in sewage treatment plants and produce a large volume of residue or sludge, which cannot be disposed of by means of dispersal into waterways, but must be removed from the decomposing chambers and is usually stockpiled in the form of solid refuse. Therefore, the volume as well as the "indigestibility" of the rumen material significantly adds to the already existing problems of city and town sewage disposal.

The magnitude and serious economical effects of the herein related sewage disposal problems affecting our national economy can be well demonstrated and calculated by the following statistical facts:

The records of the two major packing plants operating in the city of South St. Paul, Minnesota, have been made available to me for several years relative to cattle slaughter, quantities of said paunch materials and means of disposal of the same. Furthermore, in a period of over a year, I have been supplied with whatever quantities of said paunch materials I needed, up to their total supply if desired, for my research and study. The following table shows the extent of the sewage disposal and waste problem as related to the said two major packing plants in South St. Paul:

Average number of cattle slaughtered per day—2,200
Average daily volume of paunch material—15,500 gal.
Average daily weight paunch material—125,000 Lbs. or 62.5 tons
Average B.O.D. of normal paunch contents—25,000 p.p.m.
Average daily B.O.D. of paunch material-oxygen—2,640 lbs.

The two major packers in the South St. Paul area, slaughter approximately 484,000 cattle per year, which constitutes about 1²⁄₁₀ percent of the total commercial slaughter of cattle in the United States (amounting to 40,936,000 head in 1965). Thus, the yearly weight of paunch material constituting, at present, waste and sewage for the entire United States, can be approximately calculated by multiplying 62.5 tons by the number of packing plant working days in a year and then multiplying by $$83\frac{1}{3}\frac{(100)}{1.2}$$

equaling about 1,850,000 tons.

Attempts at solving the said problems have been made in recent years by the packing industry, with suggestions from the sewage disposal industry. The results have been as follows:

The general procedure has been to blast the total paunch contents at the packing plant with high velocity streams of water, thereby dissolving soluble materials clinging to or adhered to coagulants or other sticky substances of the solid fibrous globules and matted material. The flushing water and liquids are then drained crudely from the remaining solid materials and flushed down the sewage system. The solids are conveyed out of the packing plant into a stockpile where attempts have been made to cause farmers to utilize the same as fertilizer, plant foods and solid fill. Such procedure, after heavy expenditure for the flushing water, still left the packing industry with the responsibility of the more difficult disposal of the separated solids. My exhaustive studies have demonstrated that the B.O.D. (as determined by the standard 5 day method) of the liquid portion of the paunch material alone, very closely approximated that of the total content, the reason being that the solid portion of the rumen material is extremely "undigestible,"

using little oxygen in a 5 day period while the digestible portion of the liquids of the rumen is decomposed very quickly, but utilizes all necessary oxygen.

My studies have brought to light that as a matter of economic importance to the packing industry, the B.O.D. level is not substantially lowered by the separation of solids from liquids in the paunch or rumen materials. It can therefore be logically concluded that the liquids, as well as the solids, *must* be diverted from the sewage system to solve the serious problems herein referred to.

SUMMARY OF THE INVENTION

Exhaustive studies and tests of the total paunch contents from slaughtered cattle, including experiments in the areas of chemical evaluation, bacteriology, chemical treatments and conversions, convinced me that the rumen or paunch materials, both liquid and solid, contains recoverable nutritive substances for high grade animal feeds to a *commercially significant* extent. With such knowledge and decision, I then conceived and have worked out processes for treatment and conversion of the paunch materials which preserve substantially all of the nutritive qualities thereof and results in the production of wholesome, highly nutritional and readily assimilated animal feed components which will utilize up to 80% of the total volume of the former waste materials. The balance of 20% of the total volume of the rumen contents in liquid form will not be wasted or flushed through the sewage systems, but has advantageous use as will hereafter be pointed out.

Not only have I tested and experimented in the fields of chemical evaluation, bacteriology and chemical analysis determining nutritive value, but I have made exhaustive tests of recovered nutritive substances obtained in my processes from the raw paunch materials. In fact, with my process and the testing of materials obtained therefrom I am convinced that up to 75% of the commonly accepted nutritive requirements for beef cattle, which are being fed for the purpose of finishing, may be supplied by the conversion products of my process.

My new process or method essentially consists in the following important steps, to wit:

First, the total contents of the rumen or paunch materials from slaughtered cattle are obtained without dilution, by water or other solvents, thereof for the start of my process.

Next, the said total contents of the rumen are subjected to steps, without chemical effect, to physically separate the solids from the liquids. Such steps may well include drainage, suction, compression of solids containing liquids and disintegration of clumps of solid material through chopping or the like, to divide the total mass into a moist, fibrous, matted and disintegrated fraction having many important adherent substances such as coagulants, emulsions, fat globules, etc., presenting sticky surfaces which in turn adhere other solid or semi-solid ingredients thereto as the first fraction; and a second fraction which consists in a liquid or semi-liquid mass flowable by gravity.

The substances constituting the solid fraction with adhering materials, after drainage of liquid and usually compression of solids and disintegration, are then efficiently dried to render the substances and product of this fraction sterile, and to remove desired amounts of moisture, dependent upon the alternative moisture content desired. While various drying apparatus may be employed, I have found that a rotary drum-type heating and drying unit generally similar to those used in drying alfalfa and, usually with staggered and spaced flights of deflectors on the interior wall, adequate suffices where the sources of heat introduced to the contents thereof is at the requisite range of temperatures and where the drying step is carried out without "balling" up of the products or substances.

After adequate sterilization, heating and drying of the solid fragment, the products are then highly suitable for animal feed containing sterilized nutritional substances in semi-digested condition and readily assimilable. The primary use of such products (solid fraction) is for beef feeding. Commercially, it may well be desirable to dry and sterilize the solid substances to a moisture content within a range of from 20 to 22% after which the material may be readily pelletized and kept in storage and conveniently shipped and sold for feeding of cattle.

It is to be understood that products less dry, even having a moisture content of 60 to 65% may be employed quite promptly after production, for bunker and other feeding of cattle and the like.

The liquid fraction obtained from separation of the entire paunch materials constitutes a very important and commercially significant nutritive substance for animal feeding. In processing this liquid, my inventions essentially employ the collection in a large holding tank, of the liquid ingredients free of solvent, water or additive water and the like, to be initially treated with a nutritive flocculating agent which will partially precipitate the nutritive material from the paunch liquid, and also reduce the useful volume to about ⅓ of the original. The concentrated liquid usually constituting about one third of the lower contents of the tank, will be pumped into a large volume vat or equivalent sterilizer, lined or provided intermittently with steam coils or flues for sterilizing the liquid material and killing bacteria therein. The concentrated liquid, after stirring and heat treatment at temperatures to sterilize, is further treated for diethylstilbestrol inactivation, and then is concentrated, processed state with about the consistency of pea soup, constitutes a rumen liquor which is of high commercial value and nutrition, as an additive to animal feeds for hogs and other animals and fowl where cereal grain such as corn, oats and other natural food ingredients are employed.

The decanted thinner liquid not utilized or sterilized has commercial value in acting as a liquid catalyst in the degeneration of the manure content in holding pits and the like for hogs, and is ready for use in such capacities after withdrawal from the large holding tank.

My invention or inventions comprise also the production of two important, premium animal feed products which, to the best of my knowledge, are new and patentable in the industry as feed compositions, to wit:

(1) The solid composition previously described in matted fibrous form (before pelletization) containing the partially digested solid cattle rumen fibers in somewhat matted, chopped state, with globules, coagulants and dried emulsions adhering thereto, having a protein content in the range of from 10 to 12%; a fat content of from 3.1 to 3.8%, with the entire mass being thoroughly sterilized and heated to the extent of preliminary cooking.

(2) A semi-liquid or liquor having a consistency approximating that of pea soup and containing globules emulsions and water-soluble ingredients, and having in all a protein content within a range of from 1.7 to 2.3%; a fat content within a range of from 0.2 to 0.5% by weight.

Both feed compositions are relatively high in amino acids and both compositions have been sterilized and precooked, and contain no active bacteria or other organisms.

The drawing constituting a part of this application schematically illustrates an embodiment of suitable apparatus which may be utilized, as for large scale production and carrying out of my processes.

As indicated, the entire natural content of the rumens and/or paunches of slaughtered cattle, liquids and solids, without dilution or addition of water or other solvent, are conveyed or otherwise hauled and dumped in a large receiving hopper or pit, preferably having bottom suction and drainage facilities which are preferably connected with the intake of a pump. A suitable, foraminous conveyor C-1 having its receiving end preferably immersed in the contents of the receiving hopper, picks up fibrous and other solid materials from the mass and delivers the same at its outer end to apparatus for chopping up the clumps and compressing the solid material between squeeze rolls. It will be understood that in conjunction with the receiving end of conveyor C–1, power driven or manually operated loading mechanisms such as rakes, forks, etc., may be employed to expedite reception of the solid material upon the conveyor C–1. It will further be understood that underlying conveyor C–1, is a collection trough T or the like, for return of drainage liquor from the solids during the mass travel over conveyor C–1.

As indicated at the delivery end of conveyor C–1 the semi-solid materials are chopped to break up and disintegrate clumps and thereafter pass between large compression or squeeze rolls, delivering the fibrous and solid material from such rolls upon the receiving end of a second conveyor C–2. This conveyor delivers the fibrous, compressed material with many sticky, adhering materials, globules and coagulants longitudinally (with assistance of an entrance deck D) into a very large revolving drying drum. I have found that drying drums used for alfalfa wherein staggered flights of dispersion and deflecting blades are employed on the interior of the drum, is entirely satisfactory for purposes of my process. The drum, having an open receiving end, is subjected throughout the interior thereof, to forced air heating as by unit heaters which blast air longitudinally through the interior of the drum at a temperature within a range of from 2000 to 3000° F. It is important to note that the drum, in its predetermined r.p.m. and considering its dimensions will tumble, turn over and agitate the solid material as the same is heated, without producing balling action on the said material. Samples may be taken and tested for moisture content from the right or delivery end of the drying drum.

I have experimented with and obtained partially dehydrated, sterilized processed rumen solids and fed the same to beef cattle for finishing, within ranges of several moisture contents. As shown in the drawing, a fraction is frequently obtained having a moisture content from 60% to 65% which is immediately available for bunker feeding to cattle.

I have also extracted a fraction indicated as B in the drawings, at about 40% moisture content. This fraction has good keeping qualities since all bacteria has been killed, and may be stored for several weeks and fed to cattle and other nutritional value.

A third fraction has frequently been obtained in my tests, indicated as (a), having a moisture content of from 20 to 22% by weight. This solid material may be the most desirable for commercially profitable premium animal feeds, and preferably is put through a pelletizer where the contents are quite permanently preserved for storage, subsequent sale and utilization over a storage period in excess of two years.

Referring back to the liquid contents of the natural paunch ingredients, it will be seen from the drawings that the liquid draining from conveyor C–1 and exuded from the squeeze rolls, is returned by liquid return to the intake of the pump. The output of the pump is connected with the top of a large tank, preferably of the capacity of about 16,000 gallons. To the top of this tank is added a requisite amount of a nutritional flocculating agent, which essentially constitutes a protein base colloid composed of intermediate and high molecular weight polymers. An exemplary ingredient for the use I desire, is a product commercially sold as "Swift's PPA" manufactured and sold by Swift & Company of Chicago, Ill. to its industrial colloid department. This material has a pH approximating 6.5, forms a thin jell at temperatures below 80° F., and converts to a fluid when warmed above 80° F. The flocculant materials, diluted with warm water, is metered into the tank in continuous processing in a quantity and proportion of from $25/10$ to 5 parts per million, by volume.

The precipitates resulting from the foregoing flocculation are of greater specific gravity than the thin liquid, and gradually settle to the bottom of the large tank as indicated on the drawings. The heavier and lower contents of the tank approximating one third of the total capacity, is utilized for a premium animal feed concentrate or liquor and as shown, is passed to the large sterilizing vat which has circumferentially spaced along at least its lower portion, steam pipes or coils connected with steam at 15 pounds pressure from a steam boiler indicated at the right of the vat. This vat, for commercial production, should have a capacity of at least 6,000 gallons. The vat near the lower portion thereof, is preferably provided with a longitudinal auger and stirrer which works the concentrated sterilized material to a delivery passage and simultaneously causes agitation and stirring of the entire contents of the vat. The delivery of the concentrated material then in the form of a liquor at about the consistency of pea soup, is properly controlled and it will of course be understood that the sterilizing and concentration of the liquid is continued in the large vat for an adequate time to kill all live bacteria and organisms, and to have a cooking action on the ingredients. The discharge flow of the concentrated liquor from the vat is subjected to a diethylstilbestrol inactivation and the liquor then is collected in suitable vats or containers and constitutes a premium product of high nutritive value for use as a concentrate or additive to be admixed with natural animal feed ingredients such as cereal grains, corn, oats, etc.

In the diethylstilbestrol inactivation, an inert or unabsorbable adherent is metered and introduced into the passage communicating the sterilizing tank of the drawings with the storage for the processed rumen liquor, minimal proportions being used which when such an ingredient as mineral oil is employed, would constitute approximately $3/10$ parts of the ingredient to 100 parts of the rumen liquor.

In the production of the valuable rumen liquor, it is to be understood that as an alternative to the flocculating step, it is to be understood that concentration of the untreated rumen liquids may be made in the large tank or an additional vat through constant flow centrifuging of the liquid material, particularly since the solids and globules in suspension, the coagulants and other nutritive ingredients and mineral ingredients have a higher specific gravity than the unwanted liquid and water. I have made tests in a small way with constant flow centrifuging and have found that the same is successful, with the elimination of the step of addition of a flocculating agent. It is also to be understood that if constant flow centrifuging is employed as a step, that a flocculating step could also be included in the process for coming to the ultimate rumen liquor.

Before reciting an example of a substantial scale reduction to practice and tests made in accordance with my invention, and before reciting certain important feeding tests and knowledge I have obtained, it would be well to point out an unexpected discovery I made contributing to the conception of my invention, relative to the nutritive quality of the rumen contents of cattle where he animal has undergone the serious pre-slaughtering stresses. I have discovered that the nutritive quality of the rumen content of animals having undergone said pre-slaughtering stresses is definitely increased, both as to quantity and digestability when compared with the rumen content of a beef animal, alive and living under normal conditions.

The pH of the rumen content of normal beef animals is definitely on the acid side, within a range of from 5.6 to 5.5. This fact may be determined from authorities on the subject as well as from my own personal tests on living beef animals. To the best of my knowledge, while doing repeated pH checks on the rumen content of cattle shortly after slaughter of the animal and where the paunch was opened in the routine manner of the packing industry, I discovered that the pH had changed towards a marked decrease in acidity into one approximating neutral or even slightly on the alkaline side (within a range of from 6.8 to 7.5). My repeated findings of such facts led me to further research as to the cause and effect thereof. The explanation of the above factual findings may be summarized in the following manner:

The animal (beef) is normally fed well, shortly before it leaves the feed lot. Subsequently this animal is sorted, loaded into a truck and transported to the stockyards. In the stockyards the animal is driven through various pens and alleys and finally enters the packing house building where further increasingly stimulating and excitable environmental factors tend to aggravate and irritate the animal as it proceeds to the actual slaughtering pen, so that at the moment before slaughter the animal is definitely in a high degree of excitation. These environmental factors stimulate an adrenalin reaction in the animal which in turn initiates a chain of reactions that have an end result on the rumen content.

The presence of the adrenalin causes constriction of the arteries leading to the rumen, which results in corresponding decrease in blood flow normally transporting the absorbable nutrients into the physiology of assimilation. This decreased blood return therefore inhibits or slows down the transport of the nutritive elements of the rumen, which under normal circumstances would be withdrawn from the rumen content in the same length of time.

The combination of interrelationships of these factors produces the following desirable end results:

(1) There is considerably more material within the rumen of the slaughtered animal than would be present as compared to the time interval following feeding under normal conditions.

(2) The material within the rumen has undergone a much greater degree of digestion than would be anticipated because of the increased number of digesting bacteria present.

(3) The number of bacteria is markedly increased, and these bacteria themselves are readily absorbed as nutrition by the beef animals.

(4) The material is in an unusually high state of digestive breakdown as compared to normal rumen content because of the delayed absorption of the digested material. Consequently the animal which will subsequently be fed this material after the processing thereof will realize a higher degree of net energy for the purpose of growth and weight gain, because of the extensive digestive processes that it had undergone prior to the slaughter of the donor animal.

EXAMPLE

An embodiment of my two-fraction process, as disclosed herein and as carried out by the embodiment of apparatus schematically illustrated in the drawings, was made by me with a starting quantity of 2000 lbs. of natural rumen content obtained from commercially and conventionally slaughtered cattle, in quantity comprising approximately 250 gallons.

This natural rumen material, without addition of water, diluents or any solvents, was separated into a raw liquid fraction and a raw solid fraction, generally utilizing the steps of my process illustrated in the accompanying drawings. This resulted in a raw liquid fraction weighing 1500 pounds, and a raw solid fraction weighing approximately 500 pounds.

The raw liquid fraction, which included liquids obtained from the compression and squeezing of the wetted solid material, was pumped to the top of the large tank illustrated in the drawings, and a nutritive flocculating agent added as previously described. Thereafter, the settled and concentrated portion of the large tank ingredients (approximating ⅓ in volume) were subjected to the sterilizing and concentrating action in the vat with stirring and agitation.

The processing of the wet solid fraction was carried out substantially as diagrammed in the drawings and as heretofore set forth.

The results and analysis of the two premium feed products obtained were as follows:

Liquor product—500 lbs. pea soup consistency:
  Protein (by weight)—1.8%
  Fat (by weight)—0.3%
  Specific gravity—1.020%
  Solids—6.39% of total weight
  pH—6.9
Solid, fibrous product—336 lbs. moisture content 40% by weight):
  Protein (by weight)—11% average
  Fat (by weight)—3.4%

FEEDING TESTS—LIQUOR PRODUCT

I have carefully carried out feeding tests on small hogs, averaging 50 pounds in weight at the time finishing feeding was begun. I compared weight gains and feeding with an experimental pen of 50 of such hogs, giving the same each day, two feedings of the basic feed approved by the Department of Agriculture, including ground corn, minerals, antibiotics, vitamins prescribed, plus five gallons of the normal dilution admixed with the basic feed for the 50 hogs. These tests were carried out alongside of tests with two other pens of 50 hogs each, as control, hogs were fed the recommended basic finishing feed two weeks before the experimental pen, and the second pen of 50 hogs being started one week ahead of the finishing of the experimental pen. Both pens of control hogs were fed the recommended basic finishing feed with supplemental protein additives to bring the total protein up to 16% by weight.

The experimental hogs and the two pens under the control were confined and were in a controlled environment. As previously outlined, the tests were carried on for a total five week period on the experimental hogs and on the control hogs and experimental, until all reached the requisite market weight (from 210 to 225 pounds).

My tests proved that the experimental pen of 50 hogs reached market weight three weeks earlier than the average hogs of the two pens of 50 control.

FEEDING—SOLID FIBROUS PRODUCT

While I have not made the careful nutritional and feeding tests to denote gain on a cattle, alongside of control groups, I have very extensively fed the solid rumen material of my processes to more than 50 cattle of my own herd of Angus beef cattle, experimenting over a substantially long period on substitution of various proportions of the solid product for the commonly accepted nutritive requirements for beef cattle, for the purpose of feeding to finish the cattle.

My exhaustive tests on feeding beef cattle have caused me to come to the conclusion that at least 75% of the commonly accepted nutritive requirements for beef cattle fed for the purpose of finishing, may be furnished by my improved solid rumen product.

Because of the weight and bulk density factor, I have also determined that processing and hauling costs as closely as can be projected, gives my solid rumen product an economic advantage over conventional feeds.

POTENTIAL SIGNIFICANCE OF THESE INVENTIONS AS RELATED TO PRODUCTION OF FOOD FOR HUMANS

Earlier in this application, the very serious problem affecting our national economy relative to the waste and sewage now attributed to the total rumen contents of cattle, has been pointed out.

In addition to solving the former sewage and waste problem, even more important is the economical value of producing more meat for human consumption through my processes, through the utilization of the total rumen content of cattle.

By comparison with other conventional feed-stuffs the rumen material feeds (both liquor and solid fractions)

are high in digestable and absorbable protein after conversion by my process. The use of my process by packing houses for the production of feed for hogs and beef cattle, would supply a large amount of the essential needs of human nutrition, such as the amino acids and other protein "building blocks."

It will of course be understood that the basic steps of my new processes for converting total natural rumen content taken from slaughtered cattle, may be carried out by various different pieces of apparatus, and within variable measurements of temperature, moisture content and concentration of globules, coagulants and solids in suspension of the liquid fraction of the rumen, all within the scope of my inventions as defined and set forth in the appended claims.

What is claimed is:

1. A process of treating and converting the whole rumen content of slaughtered cattle to produce an animal feed composition therefrom which consists in physically separating most of the liquid ingredients from the solid ingredients of said whole rumen content to obtain a solid and a liquid fraction, treating the separated liquid fraction with an edible protein flocculating agent to partially precipitate solids, suspensions, and coagulants contained therein into a lower concentrated portion, removing said lower concentrated portion, intensely heating the lower concentrated portion to an extent to kill bacteria therein and to render the nutritive ingredients thereof more readily digestable for animals, and then treating the heated, concentrated portion to inactive diethylstilbesterol.

2. A nutritive composition for the feeding of domestic animals in the form of a sterilized and diethystilbesterol inactivated liquor having a consistency approximating that of pea soup and containing liquids and solids and suspension particles derived from concentration and edible protein-flocculation of the natural liquid fraction of the rumen content of slaughtered cattle, having a specific gravity slightly over 1.0, protein content by weight in a range of from 1.7 to 2.3%, and a fat content by weight within a range of from 0.2 to 0.5%.

3. The composition as set forth in claim 2 further characterized by having a solids content of 6.39% of the total weight of said liquor and a pH value of 6.9.

References Cited

UNITED STATES PATENTS

| | | | |
|---|---|---|---|
| 1,228,175 | 5/1917 | Berry | 99—7 |
| 2,738,273 | 3/1956 | Muhrer | 99—2 |
| 3,347,688 | 10/1967 | Frankenfeld et al. | 99—2 |

OTHER REFERENCES

Abdo et al., "Protein Quality of Rumen Microorganisms," August 1964, pp. 734–6, J. Animal Sci., vol. 23.

Hammond, "Dried Cow Manure and Dried Rumen Contents As a Partial Substitute for Alfalfa Leaf Meal," November 1944, pp. 471–476, Poultry Sci., vol. 23, No. 6.

ALVIN E. TANENHOLTZ, Primary Examiner

R. M. ELLIOTT, Assistant Examiner